United States Patent [19]
Nonobe

[11] Patent Number: 6,158,537
[45] Date of Patent: *Dec. 12, 2000

[54] POWER SUPPLY SYSTEM, ELECTRIC VEHICLE WITH POWER SUPPLY SYSTEM MOUNTED THEREON, AND METHOD OF CHARGING STORAGE BATTERY INCLUDED IN POWER SUPPLY SYSTEM

[75] Inventor: Yasuhiro Nonobe, Aichi-ken, Japan

[73] Assignee: Toyota Jidosha Kabushiki Kaisha, Toyota, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/898,343

[22] Filed: Jul. 22, 1997

[30] Foreign Application Priority Data

Jul. 22, 1995 [JP] Japan .................................. 8-212031

[51] Int. Cl.$^7$ .................................................. B60K 16/00
[52] U.S. Cl. ...................... 180/65.3; 180/65.1; 180/65.8
[58] Field of Search ................................. 180/65.3, 65.1, 180/65.8

[56] References Cited

U.S. PATENT DOCUMENTS

| | | | |
|---|---|---|---|
| 4,961,151 | 10/1990 | Early et al. . | |
| 4,962,462 | 10/1990 | Fekete | 180/65.8 |
| 5,248,566 | 9/1993 | Kumar et al. | 180/65.3 |
| 5,631,532 | 5/1997 | Azuma et al. . | |
| 5,771,476 | 6/1998 | Mufford et al. | 180/65.3 |
| 5,794,732 | 8/1998 | Lorenz et al. | 180/65.3 |
| 5,808,448 | 9/1998 | Naito | 322/13 |
| 5,820,172 | 10/1998 | Brigham et al. . | |
| 5,847,520 | 12/1998 | Theurillat et al. . | |
| 5,964,309 | 10/1999 | Kimura et al. | 180/65.8 |
| 5,966,000 | 10/1999 | Yang | 180/65.8 |
| 5,991,670 | 11/1999 | Mufford et al. | 180/65.1 |

FOREIGN PATENT DOCUMENTS

| | | |
|---|---|---|
| 47-32321 | 11/1972 | Japan . |
| 6-124720 | 5/1994 | Japan . |

*Primary Examiner*—Eric Culbreth
*Assistant Examiner*—James S. McClellan
*Attorney, Agent, or Firm*—Oblon, Spivak, McClelland, Maier & Neustadt, P.C.

[57] ABSTRACT

A power supply system 10 with a stack of fuel cells 20 and a storage battery 30 includes a remaining charge monitor 46 for measuring the remaining charge of the storage battery 30. The remaining charge monitor 46 detects the remaining charge of the storage battery 30 at the time of stopping operation of the power supply system 10. In case that the remaining charge of the storage battery 30 is not greater than a predetermined level, the fuel cells 20 continuously charge the storage battery 30 until the remaining charge reaches the predetermined level. The power supply system 10 is stopped after the charging operation of the storage battery 30 has been accomplished. At a next start of the power supply system, the storage battery 30 functions as a primary power source to supply electric power to a loading until the warm-up of the fuel cells 20 is completed.

9 Claims, 10 Drawing Sheets

POWER SUPPLY SYSTEM, ELECTRIC VEHICLE WITH POWER SUPPLY SYSTEM MOUNTED THEREON, AND METHOD OF CHARGING STORAGE BATTERY INCLUDED IN POWER SUPPLY SYSTEM

BACKGROUND OF THE INVENTION

1. Field of the Invention

The present invention relates to a power supply system, an electric vehicle with the power supply system mounted thereon, and a method of charging a storage battery included in the power supply system. More particularly the present invention pertains to a technique of keeping the remaining charge of a storage battery at or above a predetermined level in a power supply system with fuel cells and the storage battery.

2. Description of the Prior Art

A proposed power supply system includes fuel cells and storage batteries as power sources, wherein the fuel cells charge the storage batteries and the storage batteries charged to a sufficient level supply electric power to a loading (for example, JAPANESE PATENT LAYING-OPEN GAZETTE No. 6-124720). This power supply system includes a plurality of storage batteries, one of which is connected to the loading while the other is connected to the fuel cells. The storage battery having a less remaining charge is charged by the fuel cells, while the other storage battery supplies electric power to the loading. This structure ensures the sufficient charge state of the storage battery connected to the loading, thereby stably supplying electric power to the loading, such as a driving motor of the electric vehicle.

Since the proposed power supply system has a plurality of storage batteries, however, a relatively large space is required for installation of the power supply system. Especially when the power supply system is mounted on a vehicle as a power source of a motor for driving the vehicle, the relatively bulky power supply system in the restricted space of the vehicle undesirably reduces the degree of freedom in design of the vehicle. Only one storage battery is connected to the loading at one time. Each of the storage batteries is thus required to have a marginal capacity, in order to ensure sufficient outputs in case of an abrupt increase in loading, for example, at the time of starting the vehicle or going up a slope. The increase in capacity of the storage battery, however, results in increasing the weight. In some cases, it is accordingly impossible to mount a plurality of storage batteries having a sufficient capacity on the vehicle.

An improved structure has been proposed to reduce the size of the conventional power supply system that has a plurality of storage batteries and enables the storage batteries to be switched and alternately supply electric power to the loading. This improved structure has fuel cells and a storage battery, which are connected in parallel and enables at least either one of the fuel cells and the storage battery to supply electric power to the loading. In case that the loading is smaller than a predetermined level and the fuel cells have a marginal output, the fuel cells can charge the storage battery while driving the loading. In case that the loading is greater than a predetermined level, on the other hand, both the fuel cells and the storage battery work to drive the loading. This structure decreases the required capacity of the storage battery, thereby reducing the size of the power supply system.

In the power supply system of this structure that enables reduction in size, however, the characteristics of the fuel cells and the charge state of the storage battery may cause problems at the time of starting the power supply system. The fuel cells produce an electromotive force through electrochemical reactions and thus generally do not attain required outputs or stability at room temperature at the time of a start. Polymer electrolyte fuel cells, for example, realize high-output and stable power generation in the temperature range of 80° C. to 100° C. It is accordingly required to carry out warm up the fuel cells and increase the internal temperature of the fuel cells at the time of a start.

In the power supply system with the fuel cells and the storage battery, in case that the storage battery has a small remaining charge at the time of starting the power supply system, an insufficient output from the storage battery causes the fuel cells to be exposed to a large loading. FIG. 10 is a graph schematically showing the output characteristics representing the relationship between the voltage and the electric current at the time of power generation by the fuel cells. In the process of power generation by the fuel cells that are in the stationary state and thus normally operable, the fuel cells can output high voltages over a relatively wide range of electric current, although the voltage gradually decreases with an increase in electric current. In case of the fuel cells that have not yet reached the stationary state, on the other hand, the voltage abruptly drops with an increase in electric current output from the fuel cells. When the storage battery has an insufficient remaining charge at the time of starting the power supply system, the fuel cells are exposed to an extreme loading, which may cause a voltage drop and damage the function of the fuel cells as the power source.

An excess flow of electric current through the fuel cells in the insufficient warm-up state causes a voltage drop as well as uneven power generation in the respective unit cells constituting the stack of fuel cells, which results in an abnormal phenomenon, such as a change of poles in part of the unit cells. The change of poles is a phenomenon that reverses the anode and cathode in the cell reactions. Such an abnormal phenomenon makes the voltage unstable and causes energy that has not been converted to electrical energy to be released as thermal energy and partially increase the temperature of the fuel cells. The partial temperature increase damages the elements of the fuel cells and shortens the life of the fuel cells.

SUMMARY OF THE INVENTION

One object of the present invention is thus to ensure a sufficient output without increasing the size of a power supply system.

Another object of the present invention is to ensure a stable output at the time of starting a power supply system.

Still another object of the present invention is to provide such a power supply system, an electric vehicle with the power supply system mounted thereon, and a method of charging a storage battery included in the power supply system.

At least part of the above and the other related objects is realized by a power supply system having a stack of fuel cells and a storage battery, wherein at least either one of the stack of fuel cells and the storage battery supplies electric power to a loading. The power supply system of the invention includes: remaining charge detection means for detecting a remaining charge of the storage battery; and charging means for, when the remaining charge of the storage battery detected by the remaining charge detection means is less than a predetermined first level at the time of stopping operation of the power supply system, enabling the stack of fuel cells to charge the storage battery until the remaining charge of the storage battery reaches a predetermined second level.

In the power supply system of the present invention, the fuel cells continue charging the storage battery until the remaining charge of the storage battery reaches a predetermined second level, at the time of stopping operation of the power supply system. At a next start of the power supply system, the storage battery having a sufficient remaining charge can thus work as a primary power source for driving the loading. The structure of the invention effectively prevents the fuel cells from being exposed to an excess loading due to the insufficient output of the storage battery, at the time of starting the power supply system. This accordingly prevents troubles due to the excess loading, such as a voltage drop, a change of poles, and an abnormal heat emission to deteriorate the fuel cells.

The remaining charge detection means may be a voltage monitor for measuring the voltage between terminals in the storage battery, an SOC meter for accumulating the charges and discharges of the storage battery to analogize the remaining charge, or a structure of measuring the specific gravity of an electrolytic solution in the storage battery to analogize the remaining charge.

In accordance with one preferable application, the remaining charge detection means includes: electric current measurement means for measuring at least two electric currents selected among a storage battery-electric current output from the storage battery, a fuel cells-electric current output from the stack of fuel cells, and an overall electric current that is a sum of the storage battery-electric current and the fuel cells-electric current; and remaining charge determination means for determining the remaining charge of the storage battery based on the electric currents measured by the electric current measurement means.

This structure adopts a simple method that measures the electric currents to detect the remaining charge of the storage battery at the time of stopping operation of the power supply system. Unlike the voltage monitor, this structure that measures the electric currents flowing through the circuit does not require a control to temporarily break a connection of the storage battery with the fuel cells for charging the storage battery. Unlike the structure of measuring the specific gravity of an electrolytic solution, this structure does not require any specific measurement instrument to be attached to the storage battery. This structure determines the remaining charge of the storage battery only based on the electric currents measured by the electric current measurement means. Unlike the SOC meter, this structure does not require accumulation of the past data of the storage battery and is thereby free from an error due to the accumulation of the past data regarding charge and discharge of the storage battery.

In accordance with another preferable application, the charging means includes: output condition specifying means for specifying an output condition of the stack of fuel cells based on the remaining charge of the storage battery detected by the remaining charge detection means, in the process of charging the storage battery by the stack of fuel cells; and power generation control means for enabling the stack of fuel cells to generate electric power based on the output condition specified by the output condition specifying means.

The power supply system of this preferable structure enables the fuel cells to carry out power generation according to the output condition, which has been specified based on the remaining charge of the storage battery. This structure enables the storage battery to be efficiently charged within a short time period. This structure also allows just the required flows of gases to be supplied to the fuel cells.

The present invention is also directed to an electric vehicle having a motor rotated by electrical energy and means for transmitting a rotational force of the motor to an axle, thereby producing a driving force for the vehicle. The electric vehicle has the above power supply system mounted thereon, and the motor is driven by a supply of electric power from the power supply system.

In the electric vehicle of the present invention, the fuel cells continue charging the storage battery until the remaining charge of the storage battery reaches a predetermined second level, at the time of stopping operation of the power supply system mounted on the electric vehicle. At a next start of the power supply system to drive the electric vehicle, the storage battery having a sufficient remaining charge can thus work as a primary power source for driving the motor and other loads. The structure of the invention effectively prevents the fuel cells from being exposed to an excess loading due to the insufficient output of the storage battery, at the time of starting the power supply system. This accordingly prevents troubles due to the excess loading, such as a voltage drop, a change of poles, and an abnormal heat emission to deteriorate the fuel cells, thereby starting the electric vehicle in the normal condition.

In a power supply system having a stack of fuel cells and a storage battery, wherein at least either one of the stack of fuel cells and the storage battery supplies electric power to a loading, the present invention is also directed to a method of enabling the stack of fuel cells to charge the storage battery. The method of the present invention includes the steps of:

(a) detecting a remaining charge of the storage battery; and (b) enabling the stack of fuel cells to continue charging the storage battery until the remaining charge of the storage battery reaches a predetermined second level, when the remaining charge of the storage battery detected in the step (a) is not greater than a predetermined first level at the time of stopping operation of the power supply system.

In accordance with one preferable application, the step (a) includes the steps of:

(a-1) measuring at least two electric currents selected among a storage battery-electric current output from the storage battery, a fuel cells-electric current output from the stack of fuel cells, and an overall electric current that is a sum of the storage battery-electric current and the fuel cells-electric current; and (a-2) determining the remaining charge of the storage battery based on the electric currents measured in the step (a-1).

In accordance with another preferable application, the step (b) includes the steps of:

(b-1) specifying an output condition of the stack of fuel cells based on the remaining charge of the storage battery detected in the step (a), in the process of charging the storage battery by the stack of fuel cells; and (b-2) enabling the stack of fuel cells to generate electric power based on the output condition specified in the step (b-1).

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
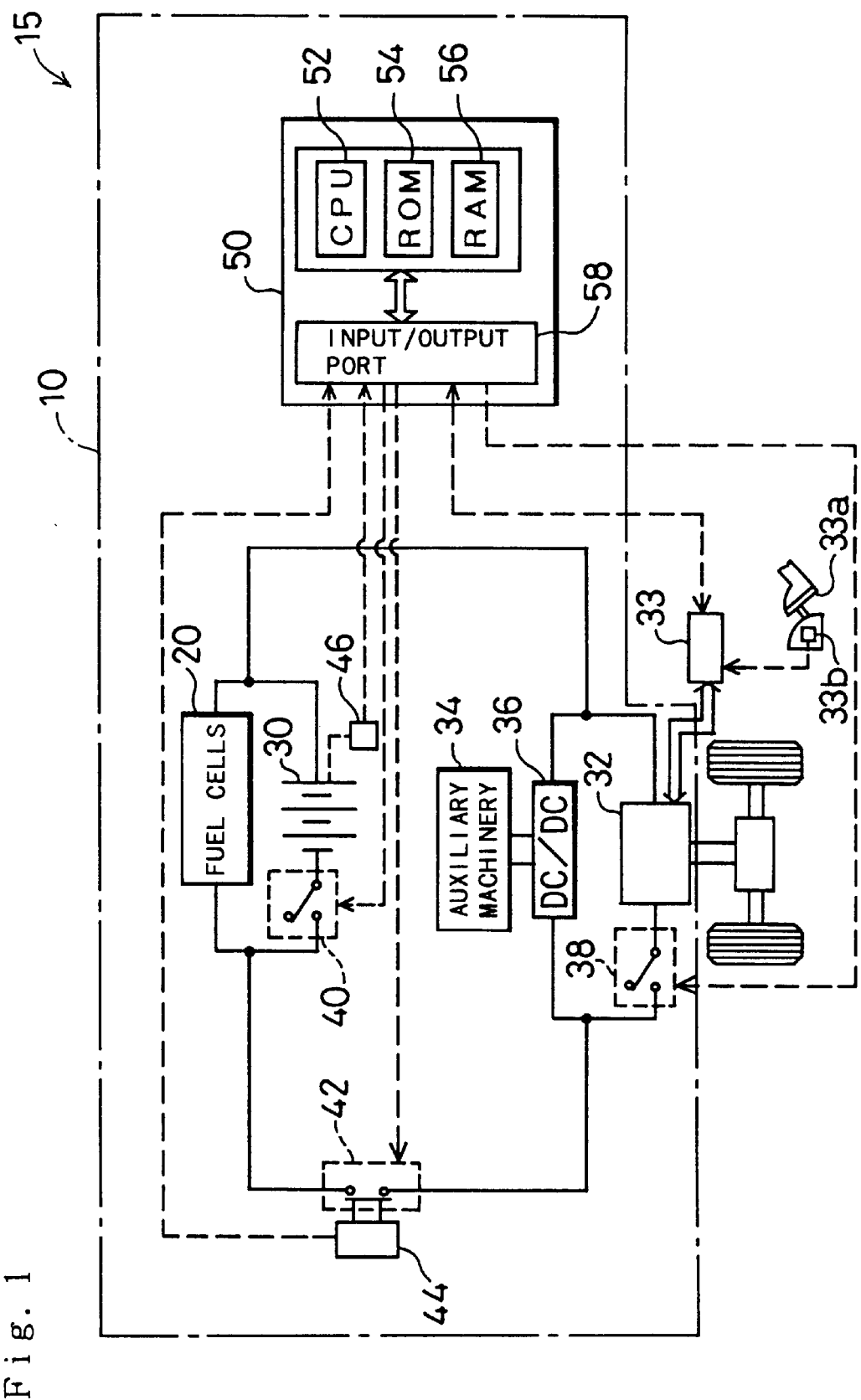
FIG. 1 is a block diagram illustrating structure of an electric vehicle 15 with a power supply system 10 as a first embodiment according to the present invention.

Some modes of carrying out the present invention are described as preferred embodiments, in order to further clarify the structures and functions of the present invention. FIG. 1 is a block diagram schematically illustrating structure of an electric vehicle 15 with a power supply system 10 as a first embodiment according to the present invention. The power supply system 10 of the embodiment mounted on the electric vehicle 15 works as a power source for driving the vehicle 15. The power supply system 10 primarily includes fuel cells 20, a storage battery 30, a motor 32 for driving the vehicle, auxiliary machinery 34, a DC/DC converter 36, on/off switches 38 and 40, a relay 42, a starter unit 44, a remaining charge monitor 46, and a control unit 50. The respective constituents of the power supply system 10 are described in detail below.

The fuel cells 20 are polymer electrolyte fuel cells, which are constructed as a stack of plural unit cells 28. The fuel cells 20 receive a supply of hydrogen-containing gaseous fuel on the side of cathodes and a supply of oxygen-containing oxidizing gas on the side of anodes and generate an electromotive force through the electrochemical reactions shown below:

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

Figure 2:
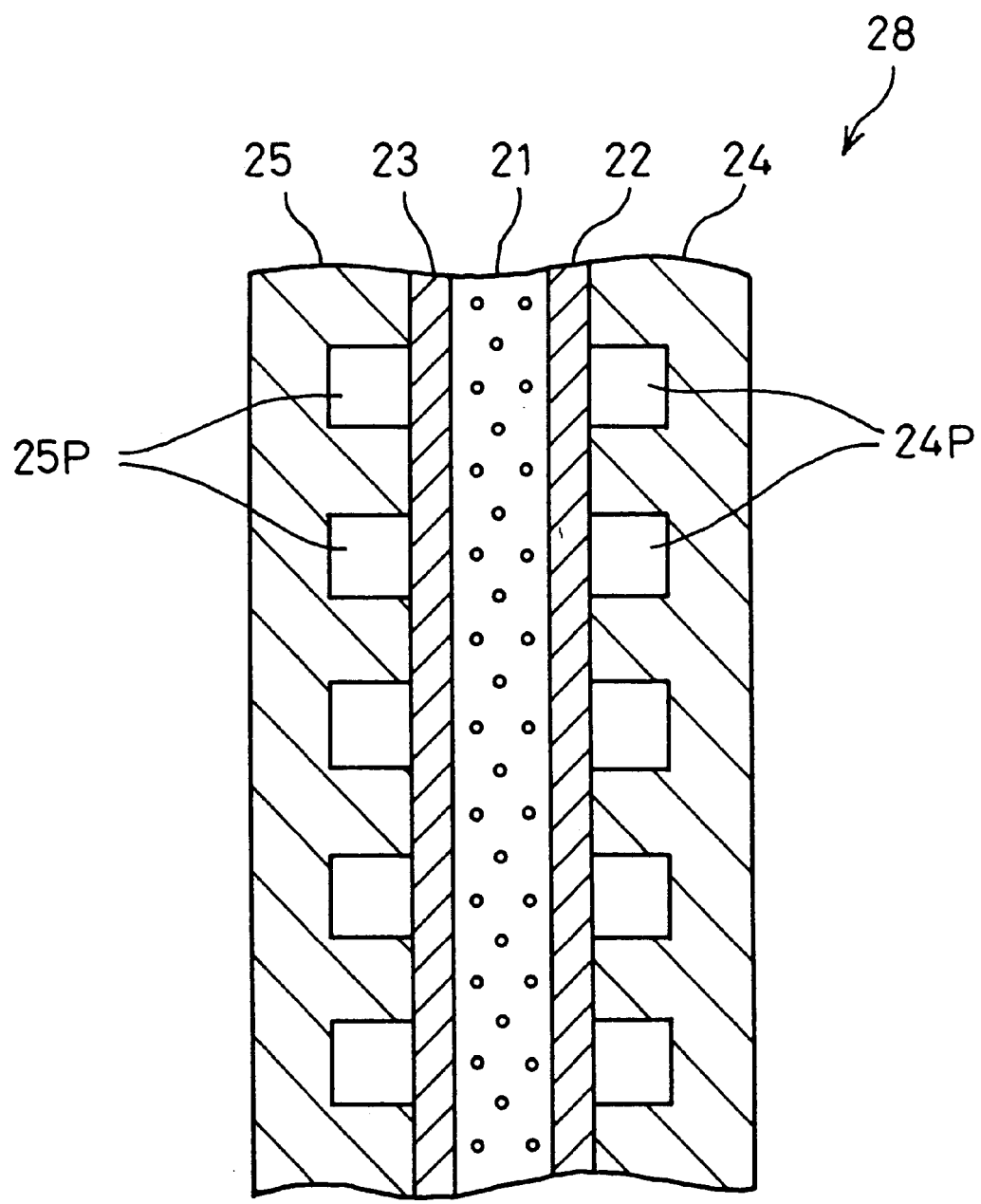
FIG. 2 is a cross sectional view schematically illustrating structure of a unit cell 28 in fuel cells 20.

Equations (1), (2), and (3) respective denote a reaction occurring at the cathodes, a reaction occurring at the anodes, and a total reaction occurring in the whole fuel cells 20. FIG. 2 is a cross sectional view illustrating structure of each unit cell 28 in the stack of fuel cells 20. The unit cell 28 includes an electrolyte membrane 21, an anode 22, a cathode 23, and separators 24 and 25.

The anode 22 and the cathode 23 are gas diffusion electrodes arranged across the electrolyte membrane 21 to construct a sandwich-like structure. The separators 24 and 25 are disposed outside the sandwich-like structure and respectively connected to the anode 22 and the cathode 23 to form flow paths of gaseous fuel and oxidizing gas. Flow paths 24P of gaseous fuel are defined by the anode 22 and the separator 24, whereas flow paths 25P of oxidizing gas are defined by the cathode 23 and the separator 25. Although the separators 24 and 25 respectively form the flow paths on their single side faces in the drawing of FIG. 2, ribs are formed on either side faces of each separator in the actual state. Namely one side face of each separator combined with the anode 22 forms the flow paths 24P of gaseous fuel, while the other side face combined with the cathode 23 of an adjoining unit cell forms the flow paths 25P of oxidizing gas. In this manner, the separators 24 and 25 are joined with the gas diffusion electrodes to define gas flow paths and separate the flow of gaseous fuel from the flow of oxidizing gas between the adjoining unit cells. In the process of laying a number of unit cells 28 one upon another to form a stack structure, the two separators located on both ends of the stack structure may have ribs only on their single side faces coming into contact with the gas diffusion electrodes.

The electrolyte membrane 21 is a proton-conductive ion-exchange membrane composed of a polymer material, such as fluororesin, and shows favorable electrical conductivity in the wet state. In this embodiment, a Nafion membrane (a perfluorosulfonic acid polymer manufactured by du Pont) is applied for the electrolyte membrane 21. The surface of the electrolyte membrane 21 is coated with platinum or a platinum-containing alloy functioning as a catalyst. The technique adopted in this embodiment to apply the catalyst prepares carbon powder with platinum or a platinum-containing alloy carried thereon, disperses the catalyst-carried carbon powder into an appropriate organic solvent, adds a specific amount of an electrolyte solution (for example, Nafion solution, a perfluorosulfonic acid polymer manufactured by Aldrich Chemical Corp.) to the dispersion to form a paste, and screen-prints the paste on the electrolyte membrane 21. Another available technique forms the paste containing the catalyst-carried carbon powder to a sheet and presses the sheet onto the electrolyte membrane 21. Although the platinum-containing catalyst is applied on the electrolyte membrane 21 in this embodiment, the catalyst may be applied on the anode 22 and the cathode 23, which are in contact with the electrolyte membrane 21.

The anode 22 and the cathode 23 are made of carbon cloth, which is woven of yarns consisting of carbon fibers. Although the anode 22 and the cathode 23 are composed of carbon cloth in this embodiment, carbon paper or carbon felt consisting of carbon fibers are also favorably applicable for the material of the anode 22 and the cathode 23.

The separators 24 and 25 are made of a gas-impermeable conductive material, for example, gas-impermeable, dense carbon obtained by compressing carbon. Each of the separators 24 and 25 has a plurality of ribs arranged in parallel and formed on both side faces thereof. As discussed previously, each separator is combined with the surface of the anode 22 to define the flow paths 24P of gaseous fuel and with the surface of the cathode 23 of the adjoining unit cell to define the flow paths 25P of oxidizing gas. In accordance with another possible structure, the ribs formed on one side face of each separator may be arranged perpendicular to or at a certain angle with those formed on the other side face of the separator. As long as the gaseous fuel and the oxidizing gas can be supplied to the gas diffusion electrodes, the ribs may not be formed as parallel grooves.

As discussed above, each unit cell 28, which is the fundamental structure of the fuel cells 20, has the separator 24, the anode 22, the electrolyte membrane 21, the cathode 23, and the separator 25, which are arranged in this sequence. The stack of fuel cells 20 is obtained by stacking plural sets of such unit cells 28 (100 sets in this embodiment) and setting current collector plates (not shown), which are made of dense carbon or copper plates, on both ends of the stack structure.

Figure 3:
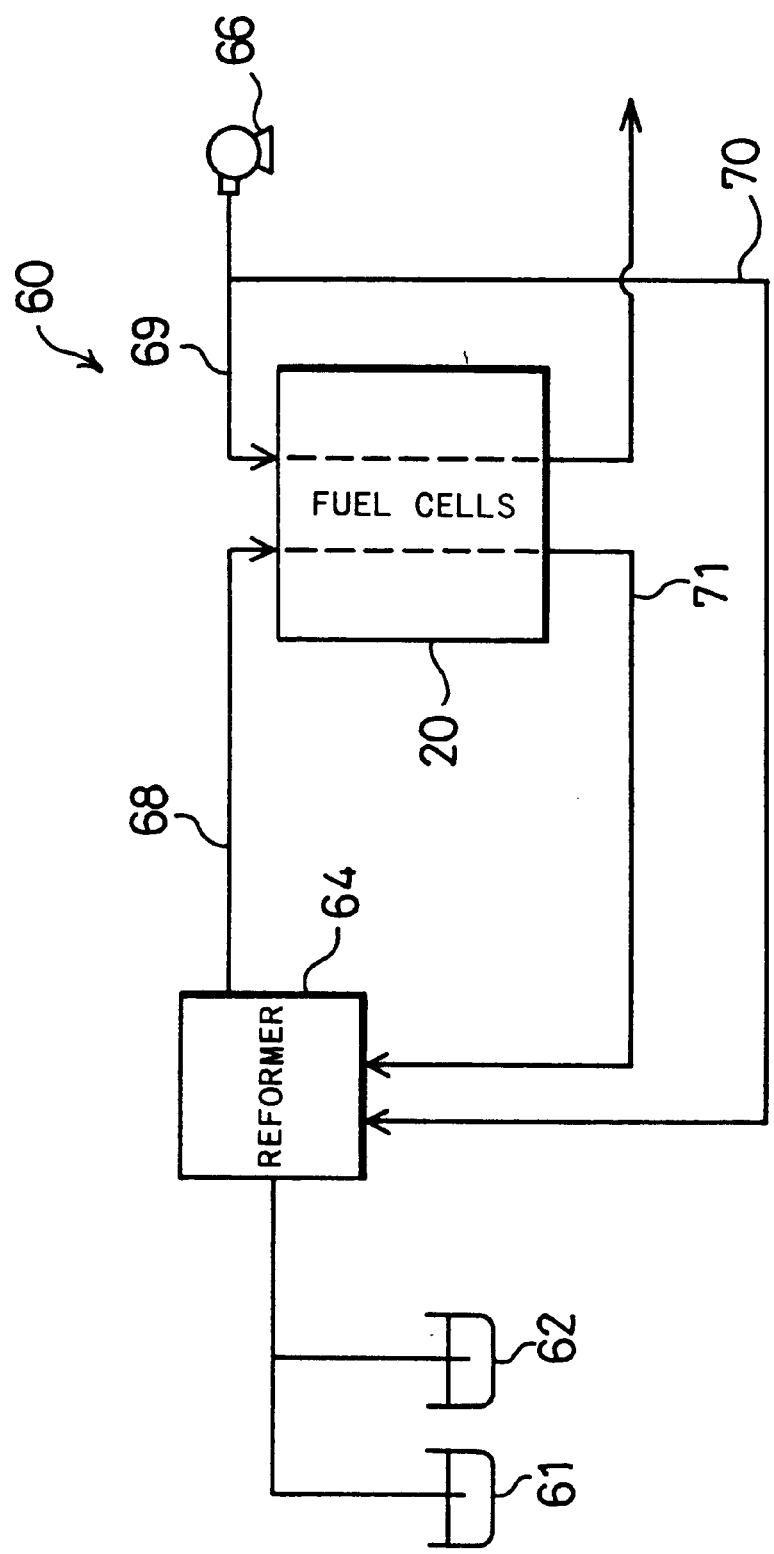
FIG. 3 is a block diagram illustrating structure of a fuel-cells unit 60.

Although being omitted from the illustration in the block diagram of FIG. 1, predetermined peripheral devices other than the fuel cells of the stack structure are required to generate electricity by means of the fuel cells. FIG. 3 is a block diagram illustrating structure of a fuel-cells unit 60 including the stack of fuel cells 20 and peripheral devices. The fuel-cells unit 60 primarily includes the stack of fuel cells 20, a methanol tank 61, a water tank 62, a reformer 64, and an air compressor 66.

The reformer 64 receives supplies of methanol and water from the methanol tank 61 and the water tank 62, respectively. The reformer 64 reforms the supply of methanol, which has been fed as a crude fuel, by steam reforming to produce a hydrogen-rich gaseous fuel. A reforming reaction expressed by the following equations occurs in the reformer 64:

$$CH_3OH \rightarrow CO + 2H_2 \qquad (4)$$

$$CO + H_2O \rightarrow CO_2 + H_2 \qquad (5)$$

$$CH_3OH + H_2O \rightarrow CO_2 + 3H_2 \qquad (6)$$

The decomposing reaction of methanol expressed by Equation (4) proceeds simultaneously with the reforming reaction of carbon monoxide expressed by Equation (5), so that the reaction of Equation (6) occurs as the overall reforming reaction of methanol in the reformer 64. This reforming reaction is endothermic as a whole. A hydrogen-rich gaseous fuel produced by the reformer 64 is fed to the stack of fuel cells 20 via a fuel supply conduit 68, led into the flow paths 24P of gaseous fuel in the respective unit cells 28 included in the stack of fuel cells 20, and subjected to the cell reaction at the anodes 22. The reaction occurring at the anodes 22 is expressed by Equation (1) given above. With a view to supplying a required amount of water and preventing the electrolyte membrane 21 from being dried, a humidifier may be disposed in the fuel supply conduit 68. In this structure, the humidified gaseous fuel is supplied to the fuel cells 20.

The air compressor 66 takes in and pressurizes the air and feeds a supply of the pressurized air to the fuel cells 20. The air taken in and pressurized by the air compressor 66 is fed to the fuel cells 20 via an air supply conduit 69, led into the flow paths 25P of oxidizing gas in the respective unit cells 28 included in the stack of fuel cells 20, and subjected to the cell reaction at the cathodes 23. In the fuel cells, the velocity of reaction increases generally with an increase in pressure of the gases supplied to both the anodes and the cathodes. This improves the performance of the fuel cells. This is why the air fed to the cathodes 23 is pressurized by the air compressor 66. The pressure of the gaseous fuel fed to the anodes 22 can be regulated readily by controlling the on-off state of a solenoid-operated valve of a mass flow controller (not shown) disposed in the fuel supply conduit 68.

The exhaust of gaseous fuel after the cell reaction at the anodes 22 in the fuel cells 20 and part of the air compressed by the air compressor 66 are fed to the reformer 64. As mentioned previously, the overall reforming reaction occurring in the reformer 64 is endothermic and requires an external supply of heat. A burner (not shown) for heating is thus disposed in the reformer 64. The exhaust of gaseous fuel and the compressed air are used for combustion of the burner. The exhaust of gaseous fuel discharged from the cathodes 23 of the fuel cells 20 are led into the reformer 64 via a fuel exhaust conduit 71, whereas the compressed air is led to the reformer 64 via an air path branch 70 branching off from the air supply conduit 69. Hydrogen remaining in the exhaust of gaseous fuel and oxygen in the compressed air are used for combustion of the burner, in order to supply a required amount of heat for the reforming reaction.

Output of the fuel cells 20 is controlled by regulating the flows of gaseous fuel and oxidizing gas according to the magnitude of a connected loading. The control of the output is carried out by the control unit 50. The control unit 50 outputs driving signals to the air compressor 66 and the mass flow controller disposed in the fuel supply conduit 68 to adjust the driving amount and the on/off state thereof, thereby regulating the flows of gases supplied.

The fuel cells 20 discussed above are connectable with the storage battery 30, the motor 32, and the auxiliary machinery 34. The fuel cells 20 charge the storage battery 30 or drive the motor 32 and the auxiliary machinery 34, according to the connecting state of the circuit. Control of the connecting state of the circuit will be described in detail later.

The storage battery 30 works together with the fuel cells 20 as a power source to supply the motor 32 and the auxiliary machinery 34 with the electric power. The storage battery 30 is a lead-acid accumulator in this embodiment, although other secondary batteries, such as a nickel-cadmium accumulator, a nickel-hydrogen accumulator, and a lithium secondary battery, are also applicable. The storage battery 30 works as a primary power source for rotating the motor 32 and the driving the vehicle at the time of starting the power supply system 10 as discussed below. The capacity of the storage battery 30 accordingly has a predetermined margin based on the expected driving conditions of the vehicle.

The motor 32 receives a supply of electric power from the fuel cells 20 and the storage battery 30 and produces a rotating driving force. The rotating driving force is transmitted to front wheels and/or rear wheels via an axle of the vehicle with the power supply system 10 mounted thereon and functions as a power to drive the vehicle. The motor 32 is controlled by a controller 33. The controller 33 is also connected to an accelerator pedal position sensor 33b for detecting a step-on amount of an accelerator pedal 33a. The controller 33 is further connected to the control unit 50 and transmits various pieces of information, for example, regarding the operation of the motor 32, to and from the control unit 50.

The auxiliary machinery 34 is a loading that consumes electric power in a predetermined range during the operation of the power supply system 10. The auxiliary machinery 34 includes, for example, the air compressor 66, the mass flow controller, and a water pump. The air compressor 66 regulates the pressure of oxidizing gas fed to the fuel cells 20 as mentioned above. The water pump circulates the cooling water under pressure through the fuel cells 20. Circulation of the cooling water leads to heat exchange in the fuel cells 20, thereby keeping the internal temperature of the fuel cells 20 at a predetermined or lower level. The mass flow controller regulates the pressure and flow of the gaseous fuel fed to the fuel cells 20 as mentioned above. Although the fuel cells 20 and the auxiliary machinery 34 are illustrated independently in the block diagram of FIG. 1, the devices relating to the control of the operating state of the fuel cells 20 can be regarded as peripheral devices of the fuel cells 20. The power consumption of such auxiliary machinery 34 is 5 kw at the maximum, which is significantly smaller than the power consumption of the motor 32 and has little variation.

The DC/DC converter 36 converts the voltage of electrical energy output from the fuel cells 20 and the storage battery 30 and applies the converted voltage to the auxiliary machinery 34. The voltage required for driving the motor 32 is generally 200 V to 300 V, and the corresponding voltage is output from the fuel cells 20 and the storage battery 30. On the other hand, the voltage required for driving the auxiliary machinery 34, such as the water pump, is only approximately 12 V. It is accordingly impossible to directly apply the voltage output from the fuel cells 20 and the storage battery 30. The DC/DC converter 36 thus lowers the voltage.

The on/off switch 38 is arranged in the circuit, which connects the motor 32 and the auxiliary machinery 34 with the fuel cells 20 and the storage battery 30 in parallel. The on/off switch 38 is switched between the on position, at which the fuel cells 20 and the storage battery 30 are connected to the motor 32, and the off position, at which the fuel cells 20 and the storage battery 30 are disconnected from the motor 32. The switching state of the on/off switch 38 is controlled by the control unit 50.

The on/off switch 40 is arranged in the circuit, which connects the fuel cells 20 with the storage battery 30 in parallel. The on/off switch 40 is switched between the on position, at which the fuel cells 20 are connected to the storage battery 30, and the off position, at which the fuel cells 20 are disconnected from the storage battery 30. The switching state of the on/off switch 40 is also controlled by the control unit 50. While the motor 32 is being driven, both the on/off switches 38 and 40 are set in the on position to close the circuit.

The driver of the vehicle with the power supply system 10 mounted thereon operates the starter unit 44 to start or stop the power supply system 10. The starter unit 44 is constructed, for example, as a predetermined starter switch disposed in the vicinity of the driver's seat in the vehicle.

The relay 42 is arranged at a predetermined position in the circuit constituting the power supply system 10 and functions as a contact to open and close the circuit. The relay 42 is connected to the starter unit 44 and the control unit 50. When the driver gives an instruction to start the power supply system 10 via the starter unit 44, the relay 42 makes a connection in the circuit that connects the fuel cells 20 and the storage battery 30 with the motor 32 and the auxiliary machinery 34. When the driver gives an instruction to stop the power supply system 10 via the starter unit 44, on the other hand, the control unit 50 causes the relay 42 to brake the connection in the circuit.

The remaining charge monitor 46 measures the remaining charge of the storage battery 30 and is realized by a voltage sensor in this embodiment. The storage battery 30 lowers the voltage with a decrease in remaining charge. The voltage sensor takes advantage of this characteristic and measures the voltage, in order to detect the remaining charge of the storage battery 30. The voltage sensor is connected to the control unit 50. The relationship between the voltage measured by the voltage sensor and the remaining charge is stored in advance in the control unit 50. The control unit 50 thus determines the remaining charge of the storage battery 30 based on the measurement input from the voltage sensor. The remaining charge monitor 46 may be realized by an SOC meter, instead of the voltage sensor. The SOC meter accumulates the values of electric current and time of charge and discharge in the storage battery 30, and the control unit 50 calculates the remaining charge of the storage battery 30 based on the accumulated values. As another example, the remaining charge monitor 46 may be a device for measuring the specific gravity of an electrolytic solution in the storage battery 30 to detect the remaining charge.

The control unit 50 is constructed as a logic circuit including a microcomputer, and has a CPU 52, a ROM 54, a RAM 56, and an input/output port 58. The CPU 52 carries out a variety of arithmetic operations according to preset control programs. Control programs and control data required for the variety of arithmetic operations executed by the CPU 52 are stored in advance in the ROM 54. Various data required for the arithmetic operations executed by the CPU 52 are temporarily written in and read from the RAM 56. The input/output port 58 receives detection signals from a variety of sensors, such as the remaining charge monitor 46, and outputs driving signals to the various actuators including the on/off switches 38 and 40 according to the results of arithmetic operations by the CPU 52, thereby controlling the driving state of the respective elements of the power supply system 10.

With respect to the control unit 50, the block diagram of FIG. 1 only shows input of detection signals from the remaining charge monitor 46 and signals from the starter unit 44, output of driving signals to the on/off switches 38 and 40, and transmission of signals to and from the controller 33. The control unit 50, however, also carries out other control operations (not shown) in the power supply system 10. By way of example, the control unit 50 carries out control of the operating state of the fuel cells 20. As mentioned previously, the other control operations executed by the control unit 50 include output of driving signals to the air compressor 66 and the mass flow controller to regulate the flows of oxidizing gas and gaseous fuel, regulation of the amounts of methanol and water supplied to the reformer 64, and temperature control of the fuel cells 20 and the reformer 64.

The power supply system 10 thus constructed works in the manner discussed below. The following first describes outputs from the fuel cells 20 and the storage battery 30 in the power supply system 10. Since the fuel cells 20 and the storage battery 30 are connected parallel to each other, the magnitude of loading and the charge state of the storage battery 30 determine whether both the fuel cells 20 and the storage battery 30 supply electric power or the storage battery 30 is charged by the fuel cells 20.

Figure 4:
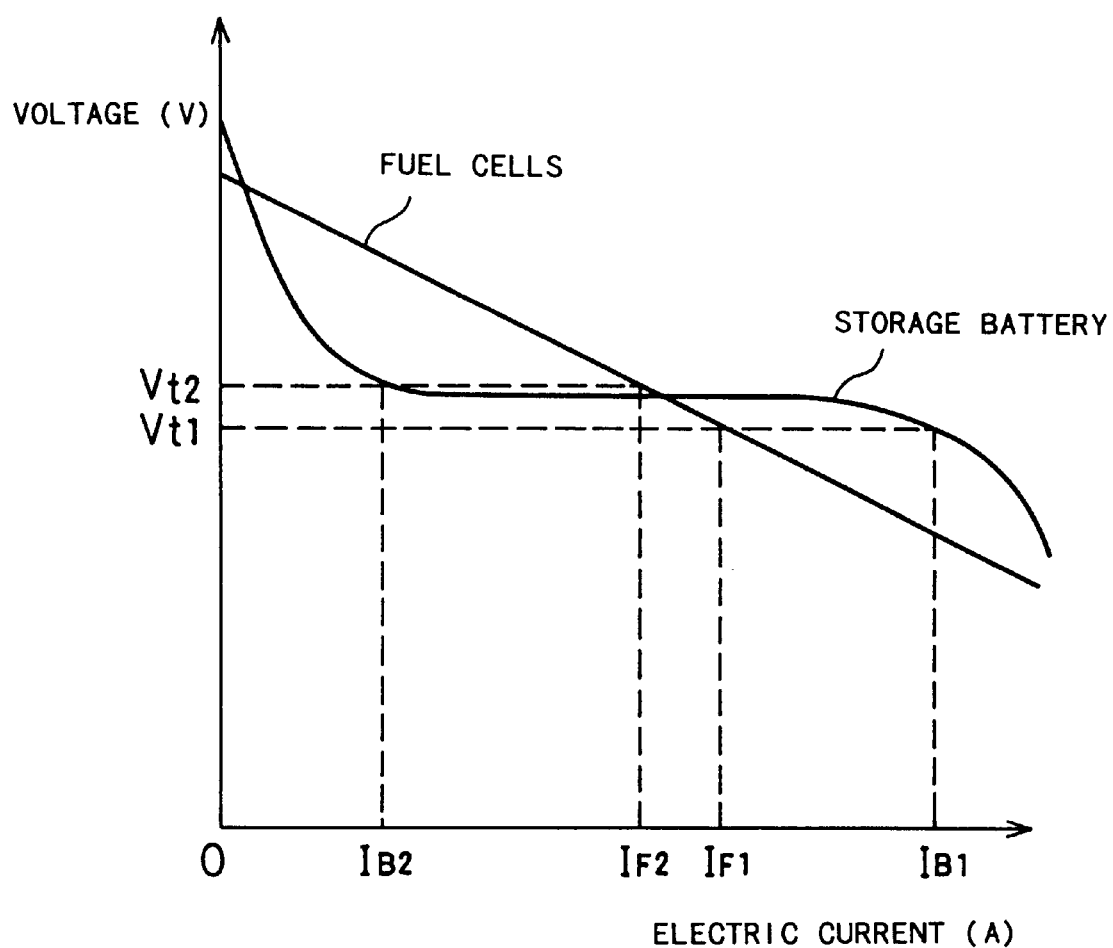
FIG. 4 is a graph showing output characteristics of the fuel cells 20 and a storage battery 30 in the sufficient charge state.

FIG. 4 is a graph showing output characteristics of the fuel cells 20 and the storage battery 30. The fuel cells 20 give large voltages under the condition of small loading, that is, under the condition of little output current, and decrease the voltage with an increase in electric current. The storage battery 30 can keep the voltage within a predetermined narrow range against a wide range of electric current, but varies the voltage according to the charge state thereof. The output characteristics of the storage battery 30 shown in FIG. 4 are in the sufficient charge state of the storage battery 30.

For example, It1 represents the overall electric current required for driving the motor 32 and the auxiliary machinery 34 in case that the vehicle with the power supply system 10 mounted thereon is accelerating and the motor 32 requires a large amount of electric power. At this moment, the voltage between output terminals of the fuel cells 20 and the storage battery 30 decreases with an increase in electric currents taken out of the fuel cells 20 and the storage battery 30. Since the fuel cells 20, the storage battery 30, and the motor 32 are connected parallel to one another, they have an identical end-to-end voltage, which is expressed as Vt1. Based on the graph of FIG. 4, output electric current IF1 of the fuel cells 20 and output electric current IB1 of the storage battery 30 satisfy the equation of It1+IF1+IB1, where IF1<IB1.

When the overall electric current required for driving the above loading is lowered to It2, the voltage between output terminals of the fuel cells 20 and the storage battery 30 increases corresponding to the decrease in overall electric current. In this state, the fuel cells 20, the storage battery 30, and the motor 32 also have an identical end-to-end voltage, which is expressed as Vt2. Based on the graph of FIG. 4, output electric current IF2 of the fuel cells 20 and output electric current IB2 of the storage battery 30 satisfy the equation of It2=IF2+IB2, where IF2>IB2. In this manner, the ratio of the output of the fuel cells 20 to the output of the storage battery 30 varies according to the magnitude of the loading.

Figure 5:
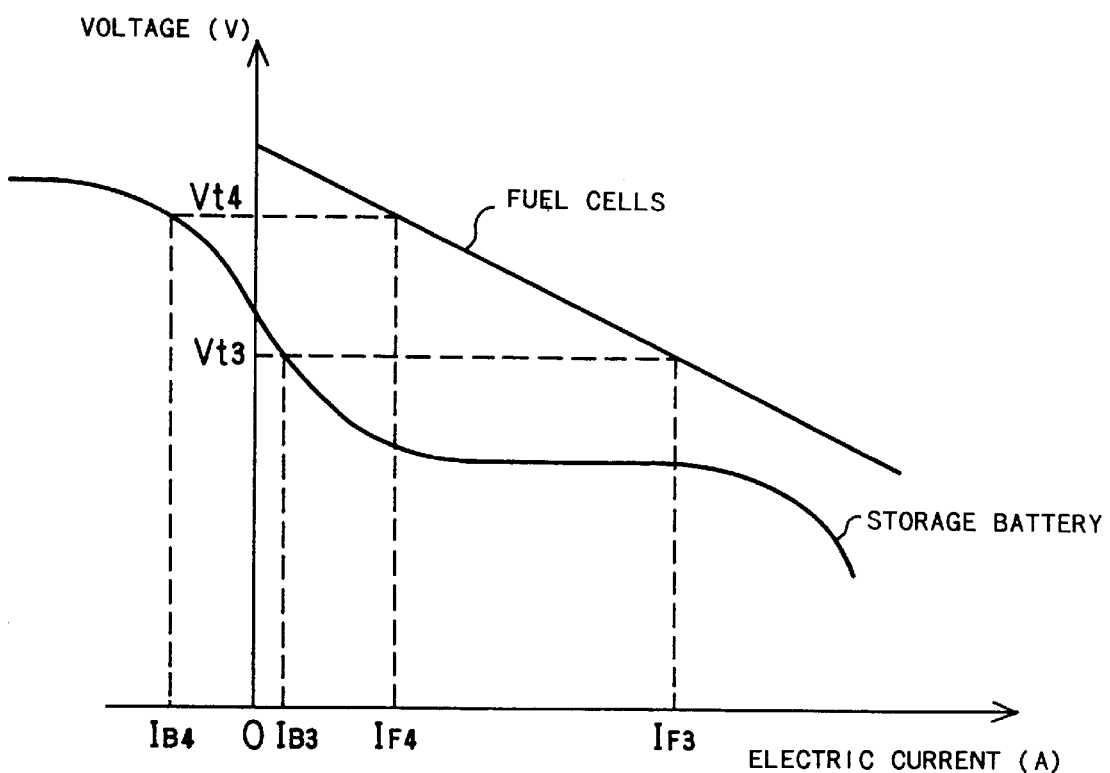
FIG. 5 is a graph showing output characteristics of the fuel cells 20 and the storage battery 30 in the insufficient charge state.

FIG. 5 is a graph showing the output characteristics of the fuel cells 20 and the storage battery 30 in the lowered charge state. It3 represents the overall electric current for driving the above loading when the motor 32 requires a predetermined amount of electric power. At this moment, the voltage between output terminals of the fuel cells 20 and the storage battery 30 decreases with an increase in electric currents taken out of the fuel cells 20 and the storage battery 30. As mentioned above, the fuel cells 20, the storage battery 30, and the motor 32 have an identical end-to-end voltage, which is expressed as Vt3. Based on the graph of FIG. 5, output electric current IF3 of the fuel cells 20 and output electric current IB3 of the storage battery 30 satisfy the equation of It3=IF3+IB3, where IF3>IB3. In case that the storage battery 30 is in the lowered charge state, a large portion of the output against the loading depends upon the fuel cells 20.

When the amount of electric power required by the motor 32 becomes smaller than a predetermined level and the overall electric current required for driving the above loading is lowered to It4, the voltage between output terminals of the fuel cells 20 and the storage battery 30 increases corresponding to the decrease in overall electric current. In this state, the fuel cells 20, the storage battery 30, and the motor 32 also have an identical end-to-end voltage, which is expressed as Vt4. Based on the graph of FIG. 5, output electric current IF4 of the fuel cells 20 and output electric current IB4 of the storage battery 30 satisfy the equation of It4=IF4+IB4, where IB4<0. This means that the storage battery 30 is charged by the fuel cells 20. In case that the storage battery 30 is in the insufficient charge state, a decrease in magnitude of loading to or below a predetermined level causes the fuel cells 20 to drive the loading and charge the storage battery 30.

Figure 6:
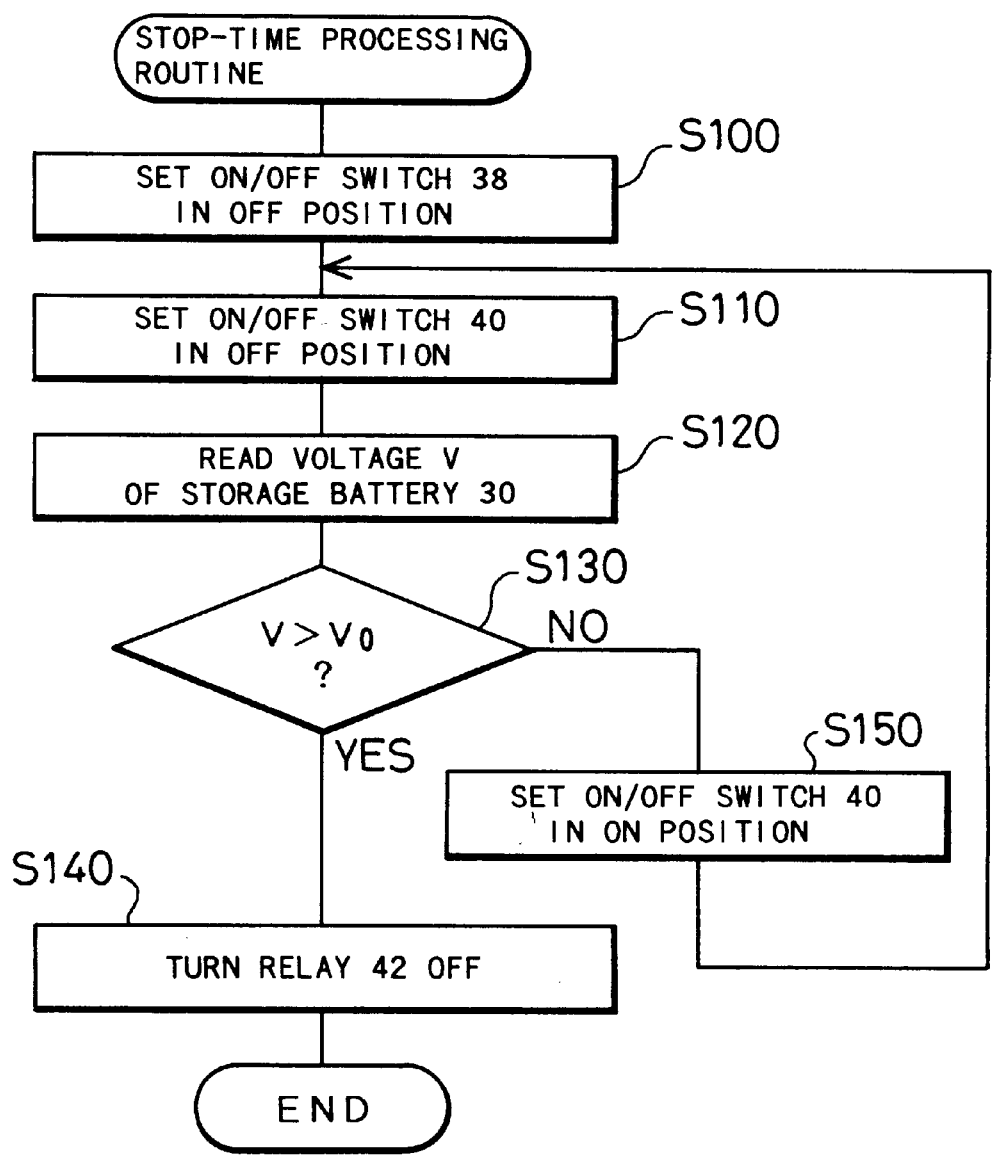
FIG. 6 is a flowchart showing a stop-time processing routine executed at the time of stopping operation of the power supply system 10 in the first embodiment.

The following describes a control of connection of the circuit at the time of stopping operation of the power supply system 10, which follows a stop-time processing routine shown in the flowchart of FIG. 6. The CPU 52 executes the routine when a predetermined start switch included in the starter unit 44 is turned off in the vehicle with the power supply system 10 mounted thereon.

When the program enters the routine of FIG. 6, the on/off switch 38 is first set in the off position, in order to separate the motor 32 from the fuel cells 20 and the storage battery 30 at step S100. This stops operation of the motor 32 for driving the vehicle and enables only the auxiliary machinery 34 to function as the loading and receive a supply of electric power. The water pump and the mass flow controller included in the auxiliary machinery 34 are essential for operation of the fuel cells 20 and required to continue working until power generation of the fuel cells 20 is stopped. The separation of the primary loading, that is, the motor 32, decreases the magnitude of the loading connected to the fuel cells 20 and the storage battery 30 to a predetermined small range. Under such conditions, in case that the remaining charge of the storage battery 30 is less than a predetermined level, the fuel cells 20 start charging the storage battery 30.

At subsequent step S110, the on/off switch 40 is set in the off position, in order to separate the storage battery 30 from the circuit. The separation of the storage battery 30 causes the fuel cells 20 to stop charging the storage battery 30 but continue power generation at a low level and maintain the stationary state, in order to ensure a continuous supply of electric power to the auxiliary machinery 34.

The CPU 52 then reads a voltage V of the storage battery 30 measured by the remaining charge monitor 46 at step S120 and compares the observed voltage V with a reference voltage V0 previously stored in the control unit 50 at step S130. The reference voltage V0 has been set in advance as an inter-terminal voltage of the storage battery 30 in the sufficient charge state. In case that the observed voltage V is greater than the reference voltage V0, the program determines that the storage battery 30 is in the sufficient charge state and turns the relay 42 off open the circuit at step S140. The program then exits from this routine. When the fuel cells 20 are disconnected from the auxiliary machinery 34, the fuel cells 20 lose all the loading, which is the object of the output, and thereby stop power generation. The auxiliary machinery 34 is stopped with no supply of electric power, and the power supply system 10 completely stops its operation.

In case that the observed voltage V is not greater than the reference value V0 at step S130, on the other hand, the program determines that the storage battery 30 is in the insufficient charge state and sets the on/off switch 40 in the on position at step S150. This connects the fuel cells 20 to the storage battery 30 in the insufficient charge state and causes the fuel cells 20 to resume charging the storage battery 30.

The program then returns to step S110 to set the on/off switch 40 in the off position, and goes to step S120 to measure the voltage V of the storage battery 30 and to step S130 to compare the observed voltage V with the reference voltage V0. When the observed voltage V is not greater than the reference voltage V0, the program again proceeds to step S150 to set the on/off switch 40 in the on position. The program repeats the charging operation of the storage battery 30 and evaluation of the remaining charge until the storage battery 30 falls in the sufficient charge state. When the observed voltage V becomes greater than the reference voltage V0 at step S130, which represents the sufficient charge state of the storage battery 30, the program goes to step S140 to turn the relay 42 off and exits from this routine.

When the power supply system 10 is started next time, that is, when the predetermined start switch included in the starter unit 44 is turned on in the vehicle with the power supply system 10 mounted thereon, the on/off switches 38 and 40 and the relay 42 make a connection in the circuit. This enables the storage battery 30 in the sufficient charge state to drive the motor 32 and the auxiliary machinery 34, while the fuel cells 20 output the electric current according to the warm-up state and eventually reach the stationary state. In order to control the operating state of the fuel cells 20 during warm-up, a temperature sensor for measuring the internal temperature of the fuel cells 20 is disposed in the fuel cells 20, and the control unit 50 receives measurement data from the temperature sensor. The control unit 50 gradually increases the flows of gases supplied to the fuel cells 20 according to the warm-up state of the fuel cells 20, so that the fuel cells 20 can gradually increase its output in progress of the warm-up. After the warm-up of the fuel cells 20 has been completed to enable the fuel cells 20 to output the electric current of or above a predetermined level, the fuel cells 20 and the storage battery 30 take charge of outputs at a predetermined ratio according to the magnitude of the loading and the charge state of the storage battery 30, while the fuel cells 20 charge the storage battery 30 according to the requirements.

As discussed above, the power supply system 10 of the embodiment stops its operation after the storage battery 30 is sufficiently charged. This structure enables the storage battery 30 in the sufficient charge state to be used as a power source when the power supply system 10 is started next time. This prevents the fuel cells 20 in the insufficient warm-up state from being exposed to an excess loading, which may cause an excess flow of electric current to drop the voltage, change poles in the fuel cells 20, and produce an abnormal heat to deteriorate the fuel cells 20. The fuel cells 20 do not give a sufficient output until the warm-up has been completed to enable the fuel cells 20 to reach the stationary state. During the warm-up of the fuel cells 20, the storage battery 30 in the sufficient charge state supplies most of the electric power required for driving the motor 32 and the auxiliary machinery 34. The fuel cells 20 can thus gradually increase the amount of output in progress of the warm-up.

Before stopping its operation, the power supply system 10 of the embodiment checks the charge state of the storage battery 30 and ensures the sufficient charge level of the storage battery 30 at the time of a next start of the power supply system 10. This structure desirably reduces the required capacity of the storage battery 30. Since the power supply system 10 of the embodiment ensures the sufficient charge level of the storage battery 30 at the time of starting the power supply system 10, the storage battery 30 is required to have a capacity that enables operation of the storage battery 30 as a primary power source at the time of starting the power supply system 10, when the fuel cells 20 are being warmed up. In the conventional structure that does not ensure the sufficient charge level of the storage battery at the time of starting the power supply system, on the other hand, a significantly large capacity is required to enable the storage battery to be kept in the marginal charge state and prevent the fuel cells from being exposed to an excess loading at the time of starting the power supply system.

Figure 7:
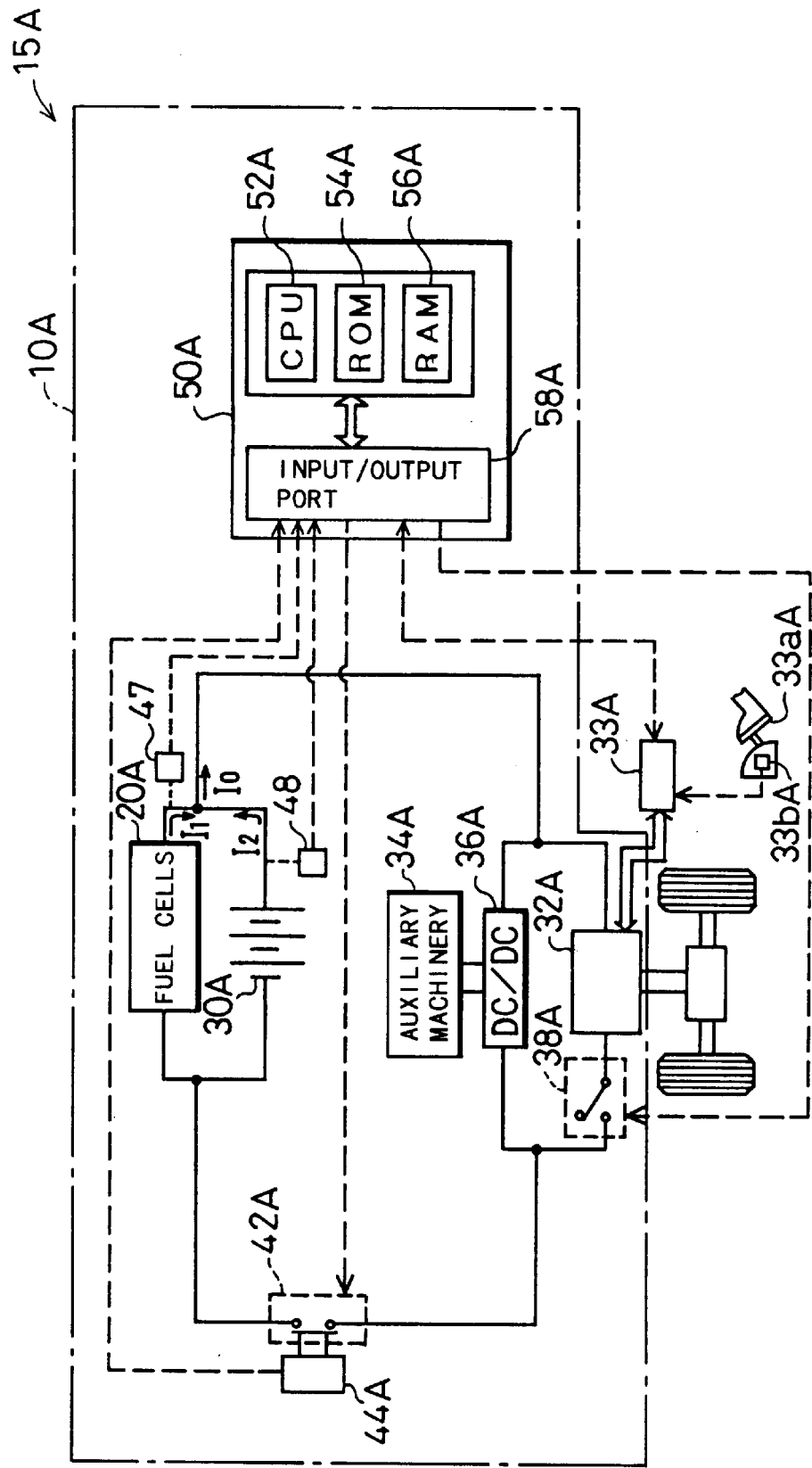
FIG. 7 is a block diagram illustrating structure of another electric vehicle 15A with a power supply system 10A as a second embodiment according to the present invention.

The structure of the first embodiment has the remaining charge monitor 46, which is realized, for example, by a voltage sensor, and detects the remaining charge of the storage battery 30. Another possible structure calculates the remaining charge of the storage battery 30 from the observed electric current flowing through the circuit. The following describes this structure as a second embodiment according to the present invention. FIG. 7 is a block diagram illustrating structure of an electric vehicle 15A with a power supply system 10A of the second embodiment mounted thereon.

The constituents of the electric vehicle 15A of the second embodiment, which are identical with those of the electric vehicle 15 of the first embodiment, are expressed by like numerals with the symbol 'A' and not specifically described here.

Referring to FIG. 7, the power supply system 10A of the second embodiment includes first and second ammeters 47 and 48, in place of the remaining charge monitor 46 included in the power supply system 10 of the first embodiment. The first ammeter 47 measures electric current I1 output from fuel cells 20A, whereas the second ammeter 48 measures electric current I2 output from a storage battery 30A. These ammeters 47 and 48 are connected to a control unit 50A, which receives data of observed electric currents. The control unit 50A determines whether or not the storage battery 30A has a sufficient remaining charge, based on these input data of observed electric currents.

Overall electric current I0 flowing through the circuit, which constitutes the power supply system 10A, is defined by the equation of I1+I2=I0. In case that the storage battery 30A is in the sufficient charge state, the storage battery 30A generates a certain amount of output, that is, I2>0. This state satisfies I1/I0<1. In case that the remaining charge of the storage battery 30A is not greater than a predetermined level and the connected loading (that is, the required electric power of a motor 32A) is smaller than a predetermined value, the fuel cells 20A charge the storage battery 30A. This state satisfies I1/I0>1. The value of I1/I0 gradually decreases to one in progress of the charging operation of the storage battery 30A by the fuel cells 20A. The value of I1/I0 depends upon the charge state of the storage battery 30A and the magnitude of the connected loading. Under the condition of a constant loading, the value of I1/I0 specifies the charge state of the storage battery 30A.

In the power supply system 10A of the second embodiment, the values of I1/I0 in case that the storage battery 30A in a 95%-charge state drives auxiliary machinery 34A are stored in advance in the control unit 50A. The value of I1/I0 is used to determine the charge state of the storage battery 30A. Like the first embodiment, the structure of the second embodiment first disconnects the motor 32A from the circuit in the process of stopping the power supply system 10A as discussed later. The loading under the supply of electric power after the disconnection of the motor 32A is restricted to the part of auxiliary machinery relating to operation of the fuel cells 20A. Detection of the driving state of the auxiliary machinery 34A under such a condition specifies the total amount of loading. The control unit 50A stores the values of I1/I0 against the expected total amounts of loading when the storage battery 30A is in the 95%-charge state.

The value of I1/I0 also varies with a variation in temperature of the storage battery 30A. The values of I1/I0 in an expected range of driving temperature of the storage battery 30A are accordingly stored as a map in the control unit 50A. The control unit 50A receives temperature data of the storage battery 30A measured by a temperature sensor (not shown) and compares data corresponding to the temperature and read from the map with the observed value of I1/I0, in the process of specifying the charge state of the storage battery 30A based on the value of I1/I0. When the observed value becomes not greater than the corresponding data, it is determined that the storage battery 30A has been charged to the 95% level.

Figure 8:
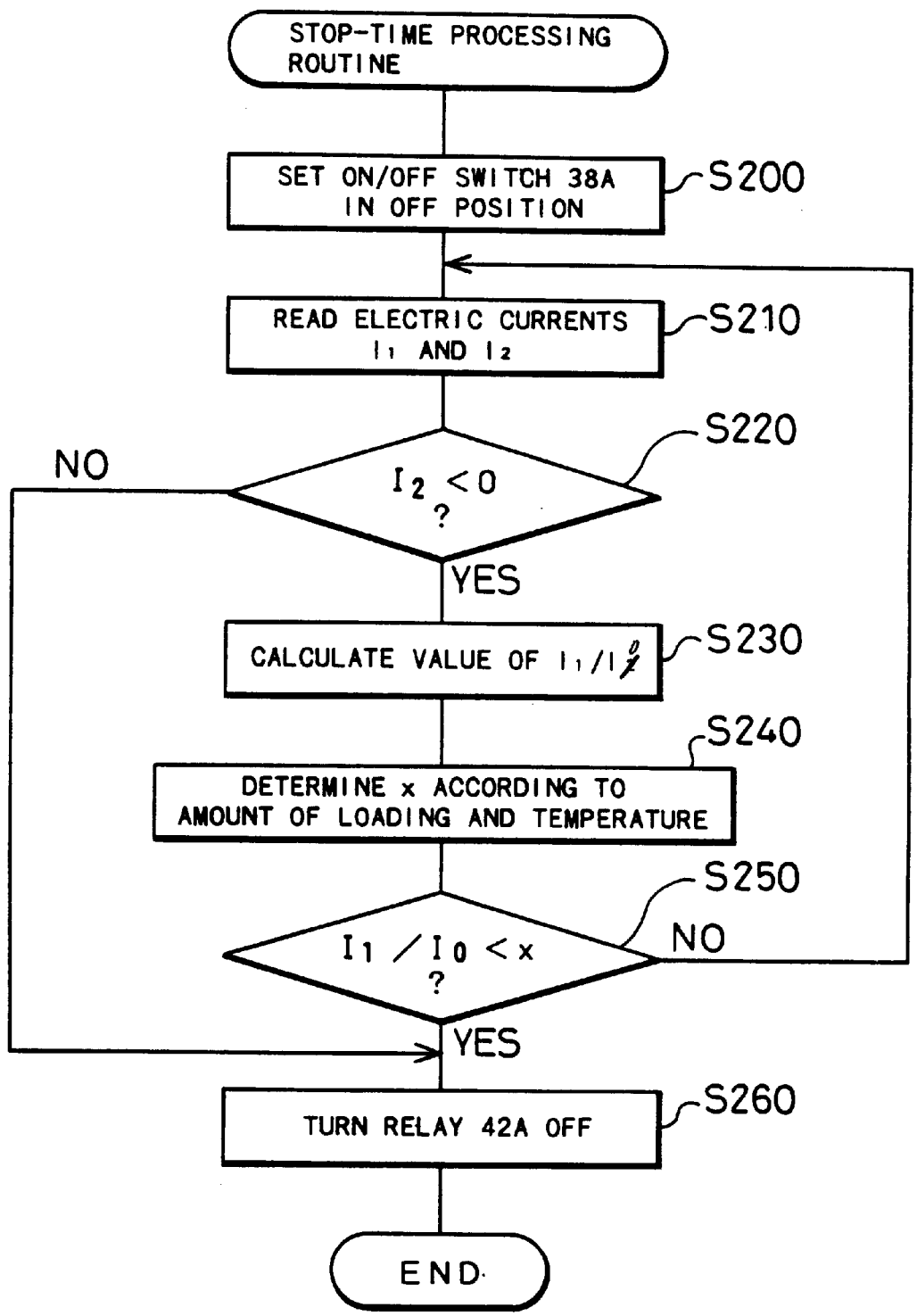
FIG. 8 is a flowchart showing a stop-time processing routine executed at the time of stopping operation of the power supply system 10A in the second embodiment.

The following describes a control of connection of the circuit at the time of stopping operation of the power supply system 10A of the second embodiment, which follows a stop-time processing routine shown in the flowchart of FIG. 8. A CPU 52A executes the routine when a predetermined start switch included in a starter unit 44A is turned off in the vehicle with the power supply system 10A mounted thereon.

When the program enters the routine of FIG. 8, an on/off switch 38A is first set in the off position, in order to separate the motor 32A from the fuel cells 20A and the storage battery 30A at step S200. This stops operation of the motor 32A for driving the vehicle and enables only the auxiliary machinery 34A to function as the loading and receive a supply of electric power. A water pump and A mass flow controller included in the auxiliary machinery 34A are essential for operation of the fuel cells 20A and required to continue working until power generation of the fuel cells 20A is stopped. The separation of the primary loading, that is, the motor 32A, enables the fuel cells 20A to positively charge the storage battery 30A when the remaining charge of the storage battery 30A is not greater than a predetermined level.

The CPU 52 then receives data of electric currents I1 and I2 respectively output from the fuel cells 20A and the storage battery 30A and measured by the first and the second ammeters 47 and 48 at step S210. At subsequent step S220, it is determined whether or not the electric current I2 has a negative value. A positive value of the electric current I2 represents the output from the storage battery 30A. In this case, the program determines that the storage battery 30A is in the sufficient charge state and proceeds to step S260 to turn a relay 42A off, before existing from this routine. When the fuel cells 20A are disconnected from the auxiliary machinery 34A, the fuel cells 20A lose all the loading, which is the object of the output, and thereby stop power generation. The auxiliary machinery 34A is stopped with no supply of electric power, and the power supply system 10A completely stops its operation.

When the electric current I2 has a negative value at step S220, on the other hand, the program determines that the storage battery 30A is in charge and then evaluates the charge state of the storage battery 30A. In accordance with a concrete procedure, the CPU 52A calculates the overall electric current I0 and the value of I1/I0 from the observed electric currents I1 and I2 at step S230. The program then proceeds to step S240 to receive data regarding the magnitude of the loading, that is, the auxiliary machinery 34A driven at this moment, and the temperature of the storage battery 30A measured by the temperature sensor (not shown) and read a reference value 'x' of I1/I0 in case that the storage battery 30A in the 95%-charge state generates an output under such conditions, from the maps stored in the control unit 50A. The value of I1/I0 calculated from the observed electric current is then compared with the reference value 'x' at step S250. When the calculated value of I1/I0 is smaller than the reference value 'x', the program determines that the storage battery 30A is in the sufficient charge state and turns the relay 42A off at step S260, prior to existing from this routine.

When the calculated value of I1/I0 is not smaller than the reference value 'x' at step S250, on the other hand, the program determines that the storage battery 30A is in the insufficient charge state and returns to step S210 to repeat the processing of steps S210 through S250 until the calculated value of I1/I0 becomes smaller than the reference value 'x'. While the storage battery 30A is in the insufficient charge state and the processing of steps S210 through S250 is repeated, the fuel cells 20A continuously charge the storage battery 30A. When the program determines that the storage battery 30A is in the sufficient charge state, based on the result of comparison at step S250, the program goes to step S260 to turn the relay 42 off and exits from this routine.

Like the first embodiment, when the power supply system 10A of the second embodiment is started next time, that is, when the predetermined start switch included in the starter unit 44A is turned on in the vehicle with the power supply system 10A mounted thereon, the on/off switch 38A and the relay 42A make a connection in the circuit. This enables the storage battery 30A in the sufficient charge state to drive the motor 32A and the auxiliary machinery 34A, while the fuel cells 20A output the electric current according to the warm-up state and eventually reach the stationary state. The fuel cells 20A in the stationary state drive the motor 32A and charge the storage battery 30A according to the requirements.

Although the reference value 'x' is specified in the 95%-charge state of the storage battery 30A in the second embodiment, the reference value may be set in another charge state of the storage battery 30A. The storage battery 30A may be in any charge state that can supply a sufficient amount of electric power to the motor 32A and the auxiliary machinery 34A without exposing the fuel cells 20A to an excess loading at least for a predetermined time period after a start of the power supply system 10A, when the fuel cells 20A in the non-stationary state and during the warm-up operation is connected to the motor 32A and the auxiliary machinery 34A in parallel. When the storage battery 30A is in the 100%-charge state or close to the full-charge state, however, it may partially cause an excess charge, which results in shortening the life of the storage battery 30A. When the storage battery 30A is in the relatively low charge state, on the other hand, the capacity of the storage battery 30A is not sufficiently utilized. The storage battery 30A is accordingly set in the 95%-charge state in this embodiment.

The power supply system 10A of the second embodiment has the following effects, in addition to the effects of the power supply system 10 of the first embodiment. Before stopping the operation of the power supply system 10A, the structure of the second embodiment determines the charge state of the storage battery 30A based on the ratio of the electric current I1 output from the fuel cell 20A to the overall electric current I0, and thus does not require the remaining charge monitor 46, such as a voltage sensor. The power supply system 10A of the second embodiment has the ammeters 47 and 48 to monitor the electric currents flowing through the circuit at the moment. The structure of monitoring the electric currents is relatively simple and does not require the switching operation of the circuit for measurement, unlike the voltage sensor in the first embodiment. The power supply system 10A accordingly does not have the on/off switch 40, which realizes a simpler circuit structure and simplifies the operation of stopping the power supply system 10A. In the structure of the first embodiment, the remaining charge monitor 46 may be an SOC meter that stores the historical data of outputs and accumulates the stored data of outputs to calculate the present remaining charge. The structure of the second embodiment, however, does not require such calculation and thereby simplifies the control procedure. The remaining charge monitor 46 may alternatively be a device for measuring the specific gravity of an electrolytic solution in the storage battery 30, in the structure of the first embodiment. The storage battery 30A of the second embodiment, however, does not require any such device, which simplifies the structure of the power supply system 10A.

Compared with the method of the first embodiment using the remaining charge monitor 46, such as a voltage sensor, the method of the second embodiment for detecting the remaining charge of the storage battery 30A based on the electric currents measured by the ammeters 47 and 48 has a higher precision in detection of the remaining charge. The structure of the second embodiment is especially advantageous when a lead-acid accumulator is used as the storage battery 30A. In the lead-acid accumulator, the voltage does not substantially decrease while the remaining charge is above a predetermined level, but is abruptly lowered after the remaining charge has decreased to or below the predetermined level. It is accordingly rather difficult to detect the remaining charge with a high precision by measurement of the voltage. The power supply system 10A of the second embodiment measures the electric currents, instead of the voltage. Even when a lead-acid accumulator is applied for the storage battery 30A, the structure of the second embodiment enables detection of the remaining charge with a high precision. In case that an SOC meter is used as the remaining charge monitor 46, an error between the remaining charge calculated from the accumulated outputs and the actual remaining charge significantly expands through the repeated charges and discharges of the storage battery 30. The structure of the second embodiment with the ammeters 47 and 48, however, detects the remaining charge based on the measurement data of electric currents at the moment, which effectively prevents expansion of the error.

The structure of the second embodiment calculates the ratio of the electric current I1 of the fuel cells 20A to the overall electric current I0 and compares the ratio with the reference value x, so as to evaluate the charge state of the storage battery 30A. A modified structure may utilize another value based on the observed electric currents for evaluation of the charge state of the storage battery 30A. For example, the structure may compare the ratio of the electric current I2 of the storage battery 30A in charge (I2<0) to the overall electric current I0 with a predetermined reference value 'y'. In this structure, like the reference value 'x' of the second embodiment, the reference value 'y' is set in advance to represent the sufficient charge state of the storage battery 30A (y<0). When the value of I2/I0 becomes greater than the reference value 'y', it is determined that the storage battery 30A has been charged to the sufficient level.

The power supply system 10A discussed above measure the output electric current I1 of the fuel cells 20A and the output electric current I2 of the storage battery 30A with the first and the second ammeters 47 and 48 and calculate the overall electric current I0. A modified structure may directly measure the overall electric current I0 with a predetermined ammeter and compare the observed overall electric current I0 with either the output electric current I1 or the output electric current I2. When at least two out of the output electric current I1 of the fuel cells 20A, the output electric current I2 of the storage battery 30A, and the overall electric current I0 are measured, the above method can be applied to compare the relationship between the observed electric currents with a predetermined reference value and thereby detect the remaining charge of the storage battery 30A.

As discussed above, in the power supply system 10A of the second embodiment, the fuel cells 20A continue charging the storage battery 30A until the program determines that the storage battery 30A is in the sufficient charge state at step S250 in the stop-time processing routine of FIG. 8. Appropriate control of the driving conditions of the fuel cells 20A enables the charging operation of the storage battery 30A to be accomplished efficiently within a relatively short time period. The following describes the procedure of controlling the driving conditions of the fuel cells 20A as a third embodiment according to the present invention. The power supply system of the third embodiment has an identical structure to that of the power supply system 10A of the second embodiment.

Figure 9:
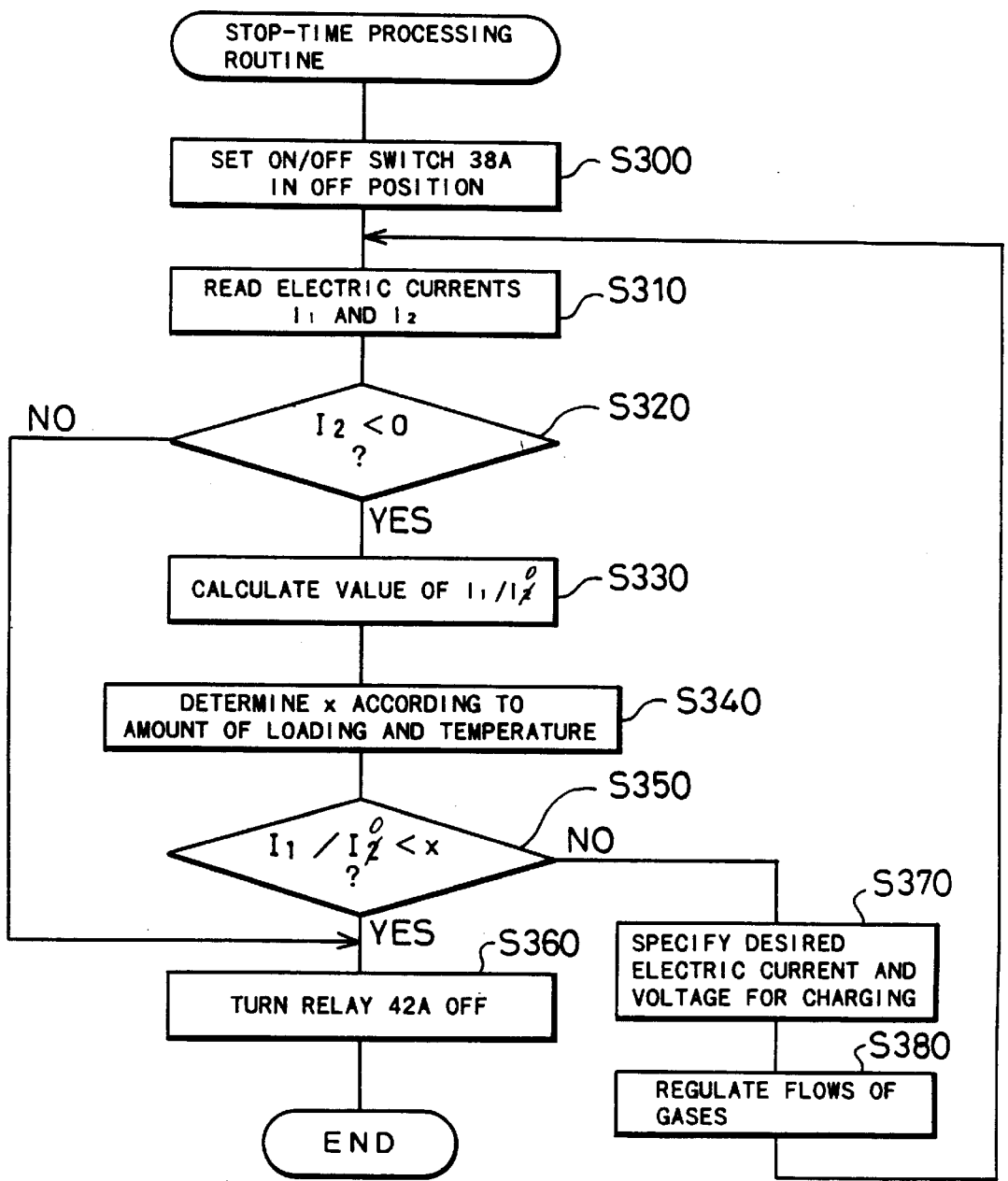
FIG. 9 is a flowchart showing another stop-time processing routine executed at the time of stopping operation of the power supply system 10A as a third embodiment according to the present invention.
Figure 10:
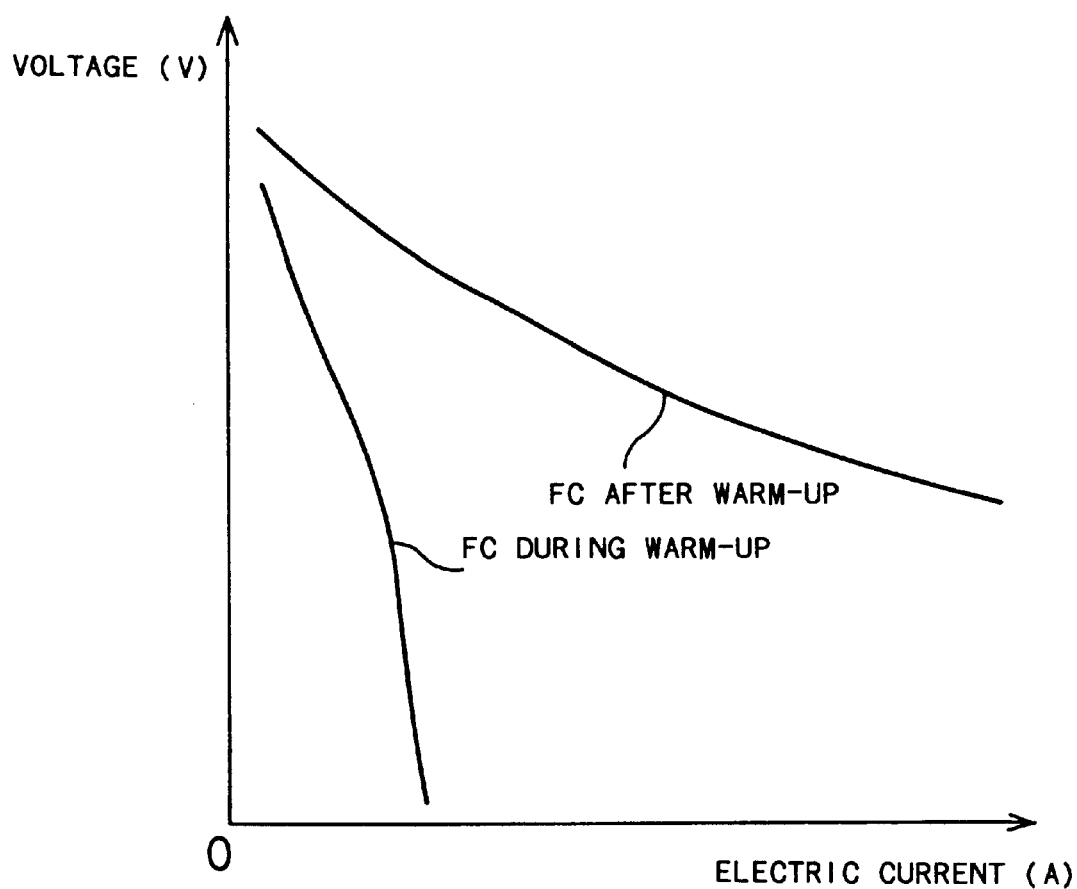
FIG. 10 is a graph showing output characteristics of the fuel cells before and after a warm-up.
Figure 8:
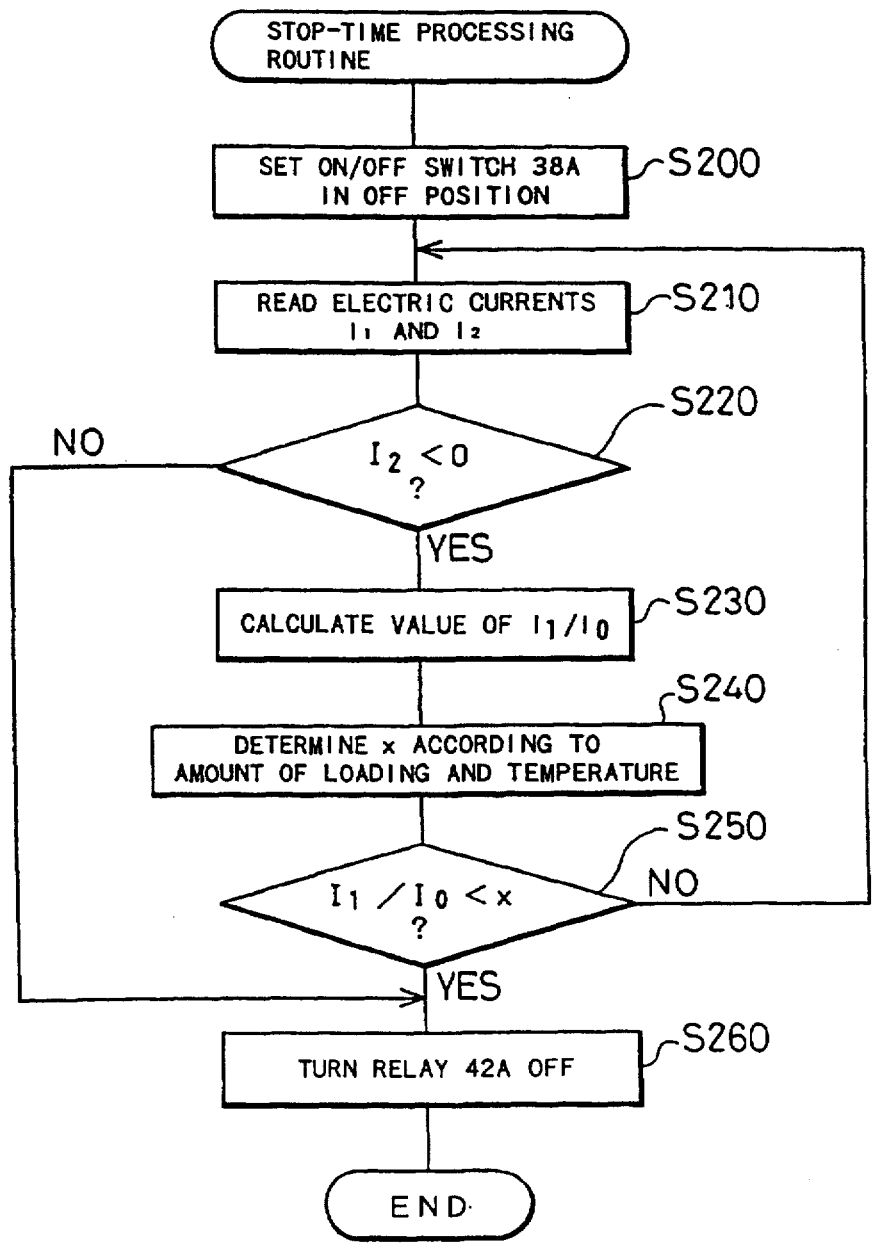
Figure 9:
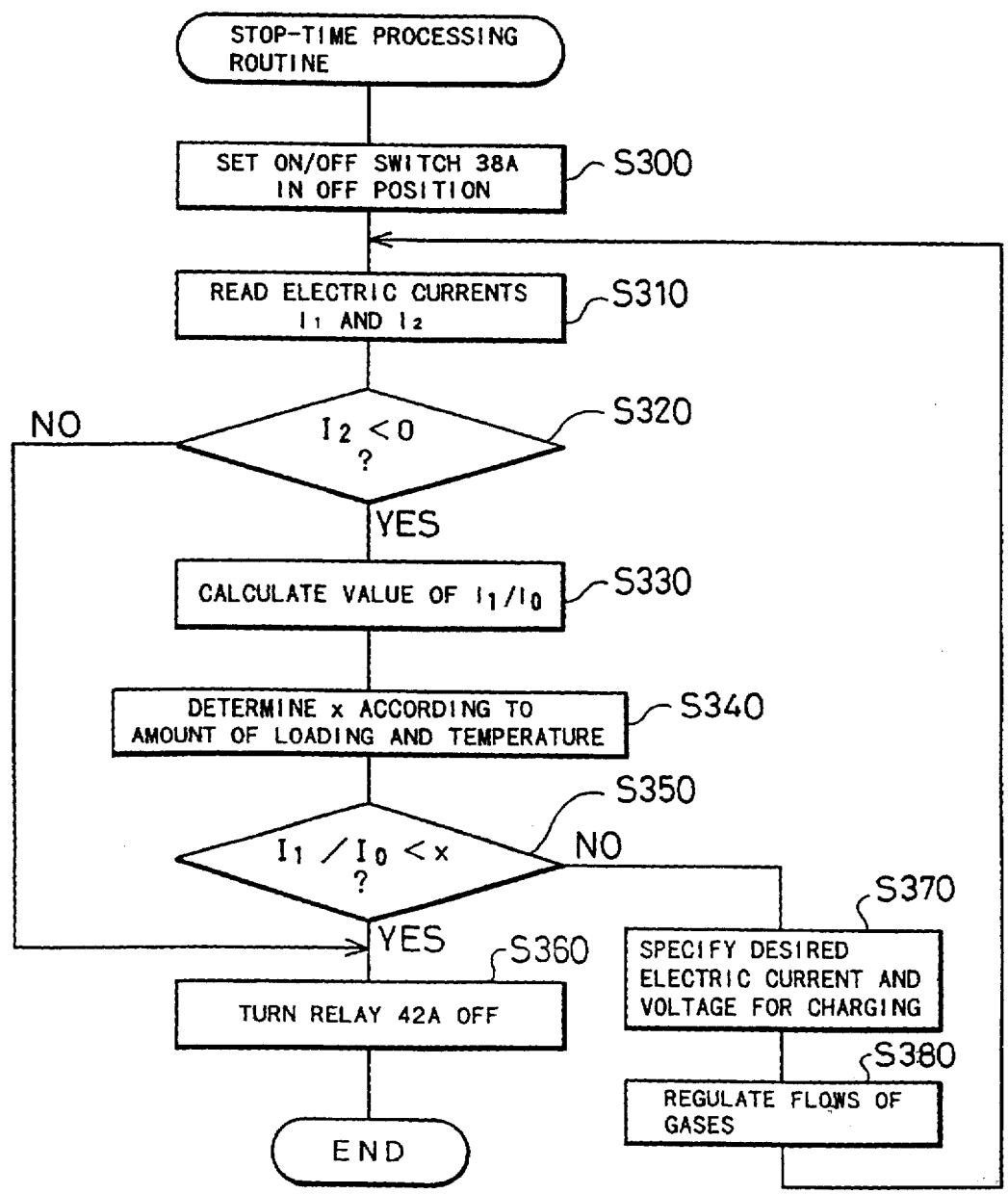

FIG. 9 is a flowchart showing a stop-time processing routine carried out when the power supply system of the third embodiment stops its operation. Like the routine of the second embodiment, the routine of the third embodiment is executed by the CPU 52A when the predetermined start switch included in the starter unit 44A is turned off in the vehicle with the power supply system 10A mounted thereon.

The processing of steps S300 through S360 in the routine of FIG. 9 is identical with the processing of steps S200 through S260 in the stop-time processing routine of FIG. 8 and is thus not specifically described here. When the electric current I2 has a positive value at step S320 or when the value of I1/I0 is smaller than the reference value 'x' at step S350, the program determines that the storage battery 30A is in the sufficient charge state and goes to step S360 to turn the relay 42A off, prior to exiting from this routine.

When the value of I1/I0 is not smaller than the reference value 'x' at step S350, the program determines that the storage battery 30A is in the insufficient charge state and proceeds to step S370 to calculate desired values of electric current and voltage for charging the storage battery 30A to the 95%-level, based on the present charge state of the storage battery 30A that is specified by the value of I1/I0.

After the calculation of the desired values of electric current and voltage, the CPU 52A regulates the flows of gases supplied to the fuel cells 20A at step S380, in order to enable the storage battery 30A to be charged under such conditions. The flows of gases supplied to the fuel cells 20A are determined according to the intensity of the outputs from the fuel cells 20A. The control unit 50 calculates the flows of gases required to obtain the desired outputs calculated at step S370, and controls the related constituents of the fuel-cells unit 60A (see FIG. 3) based on the calculation of gas flows, in order to actually supply the required amounts of gases. The fuel cells 20A then charge the storage battery 30A under the output conditions determined at step S370.

After the regulation of gas flows at step S380, the program returns to step S310 to receive data of electric currents I1 and I2 and repeats the processing discussed above. The above procedure of determining the charging conditions for the storage battery 30A and regulating the flows of gases supplied to the fuel cells 20A continues until the storage battery 30A falls in the sufficient charge state, which is determined either by the fact that the electric current I2 has a positive value at step S320 or by the fact that the value of I1/I0 is smaller than the reference value 'x' at step S350. In this manner, the fuel cells 20A continuously charge the storage battery 30A according to the predetermined conditions. When it is determined that the storage battery 30A is in the sufficient charge state either at step S320 or at step S350, the program turns the relay 42A off at step S360 and exits from this routine.

In case that the storage battery 30A is determined to be in the insufficient charge state at the time of stopping operation of the power supply system 10A, the structure of the third embodiment specifies the desired charging conditions for the storage battery 30A and operates the fuel cells 20A based on the specified charging conditions. This structure enables the charging operation of the storage battery 30 to be accomplished within a short time period, prior to a stop of the power supply system 10A. The structure of the third embodiment also enables the flows of gases corresponding to the charging conditions to be supplied to the fuel cells 20A. This effectively prevents the supplies of gases from being wastefully fed to the fuel cells 20A and prevents the energy from being wastefully supplied to the auxiliary machinery 34A, which functions to feed the gases to the fuel cells 20A.

In the power supply system 10A of the third embodiment, the fuel cells 20A are driven in the stationary state at temperatures raised to a predetermined range while the fuel cells 20A continuously charge the storage battery 30A at the time of stopping operation of the power supply system 10A. Since the fuel cells 20A in the stable state charge the storage battery 30A, the power supply system 10A of the third embodiment can readily calculate and regulate the supplies of gases fed to the fuel cells 20A, based on the desired charging conditions for the storage battery 30A.

The power supply system of the third embodiment has an identical structure to that of the power supply system 10A of the second embodiment. In accordance with a possible modification, the power supply system of the third embodiment may have an identical structure to that of the power supply system 10 of the first embodiment. Namely the charge state of the storage battery 30 may be detected by the remaining charge monitor 46, such as a voltage sensor or an SOC meter. In this case, the desired charging conditions for the storage battery 30 are determined according to the results of detection of the remaining charge monitor 46, and the flows of gases supplied to the fuel cells 20 are regulated to attain the predetermined charging conditions. This structure exerts the same effects as those of the third embodiment discussed above.

In all of the above embodiments, the power supply system of the present invention is mounted on a vehicle and used as a power source for driving the vehicle. The loading, to which the power supply system of the present invention supplies electric power, is, however, not restricted to the motor for driving the vehicle. The structure ensures the sufficient charge state of the storage battery at the time of stopping operation of the power supply system, thereby exerting the same effects as those of the above embodiments at a next start of the power supply system. This prevents the fuel cells in the insufficient warm-up state from being exposed to an excess loading, which may cause a voltage drop in the fuel cells or an abnormal heat emission.

The present invention is not restricted to the above embodiments or their modified examples, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A power supply system comprising a stack of fuel cells and a storage battery, wherein at least either one of said stack of fuel cells and said storage battery supplies electric power to a loading, said power supply system comprising:
   an electric current detector that detects at least two electric currents selected among three different current values, that is a storage battery-electric current output from said storage battery, a fuel cells-electric current output from said stack of fuel cells, and an overall electric current that is a sum of the storage battery-electric current and the fuel cells-electric current;
   a remaining charge determining unit that determines a remaining charge of said storage battery, based on a relationship between the at least two electric currents out of the three different electric current values, which is obtainable from the result of measurement by said electric current detector; and
   charging means that, when the remaining charge of said storage battery determined by said remaining charge determining unit is not greater than a predetermined first level at the time of stopping operation of said power supply system, causes said storage battery to be continuously charged by said stack of fuel cells until the remaining charge of said storage battery reaches a predetermined second level.

2. A power supply system in accordance with claim 1, wherein said charging means comprises:
   output condition specifying means for specifying an output condition of said stack of fuel cells based on the remaining charge of said storage battery determined by said remaining charge determining means, in the process of charging said storage battery by said stack of fuel cells; and
   power generation control means for enabling said stack of fuel cells to generate electric power based on the output condition specified by said output condition specifying means.

3. A power supply system in accordance with claim 1, wherein said remaining charge determination unit comprises:
   a computation unit that calculates a ratio of two different electric currents, which are selected among the storage battery-electric current output from said storage battery, the fuel cells-electric current output from said stack of fuel cells, and then overall electric current that is the sum of the storage battery-electric current and the fuel cells-electric current, based on the at least two electric currents detected by said electric current detector; and
   wherein the remaining charge of said storage battery is determined according to the ratio of the two different electric currents calculated by said computation unit.

4. A power supply system in accordance with claim 3, wherein said charging means comprises:
   an output condition specification unit that specifies an output condition of said stack of fuel cells, based on the remaining charge of said storage battery determined by said remaining charge determination means, in the process of charging said storage battery by said stack of fuel cells; and
   a power generation control unit that causes said stack of fuel cells to generate electric power according to the output condition specified by said output condition specification unit.

5. An electric vehicle having a motor rotated by electric energy and means for transmitting a rotational force of said motor to an axle, thereby producing a driving force for said vehicle,
   said electric vehicle having a power supply system mounted thereon, said power supply system comprising a stack of fuel cells and a storage battery, wherein at least either one of said stack of fuel cells and said storage battery supplies electric power to said motor, said power supply system further comprising:
   an electric current detector that detects at least two electric currents selected among three different current values, that is, a storage battery-electric current output from said storage battery, a fuel cells-electric current output from said stack of fuel cells, and an overall electric current that is a sum of the storage battery-electric current and the fuel cells-electric current;

remaining charge determining unit the determines a remaining charge of said storage battery, based on a relationship between the at least two electric currents out of the three different electric current values, which is obtainable from the result of measurement by said electric current detector; and charging means that, when the remaining charge of said storage battery determined by said remaining charge determining means is not greater than a predetermined first level at the time of stopping operation of said power supply system, causes said storage battery to be continuously charged by said stack of fuel cells until the remaining charge of said storage battery reaches a predetermined second level.

6. In a power supply system comprising a stack of fuel cells and a storage battery, wherein at least either one of said stack of fuel cells and said storage battery supplies electric power to a loading, a method of enabling said stack of fuel cells to charge said storage battery, said method comprising the steps of:

(a) detecting at least two electric currents selected among three different current values, that is, a storage battery-electric current output from said storage battery, a fuel cells-electric current output from said stack of fuel cells, and an overall electric current that is a sum of the storage battery-electric current and the fuel cells-electric current;

(b) determining a remaining charge of said storage battery, based on a relationship between the at least two electric currents out of the three different electric current values, which is obtainable from the result of measurement in step (a); and (c) causing said storage battery to be continuously charged by said stack of fuel cells until the remaining charge of said storage battery reaches a predetermined second level, when the remaining charge of said storage battery determined in said step (b) is not greater than a predetermined first level at the time of stopping operation of said power supply system.

7. A method in accordance with claim 6, wherein said step comprises the steps of:

(c-1) specifying an output condition of said stack of fuel cells, based on the remaining charge of said storage battery determined in said step (b), in the process of charging said storage battery by said stack of fuel cells; and (c-2) enabling said stack of fuel cells to generate electric power based on the output condition specified in said step (c-1).

8. A method in accordance with claim 6, wherein said step (b) comprises the steps of:

(b-1) calculating a ratio of two different electric currents, which are selected among the storage battery-electric current output from said storage battery, the fuel cells-electric current output from said stack of fuel cells, and then overall electric current that is the sum of the storage battery-electric current and the fuel cells-electric current, based on the at least two electric currents detected in said step (a); and (b-2) determining the remaining charge of said storage battery according to the ratio of the two different electric currents calculated in said step (b-1).

9. A method in accordance with claim 8, wherein said step (c) comprises the steps of:

(c-1) specifying an output condition of said stack of fuel cells, based on the remaining charge of said storage battery determined in said step (b), in the process of charging said storage battery by said stack of fuel cells; and (c-2) causing said stack of fuel cells to generate electric power according to the output condition specified in said step (c-1).

* * * * *

UNITED STATES PATENT AND TRADEMARK OFFICE
CERTIFICATE OF CORRECTION

PATENT NO. : 6,158,537
DATED : December 12, 2000
INVENTOR(S) : Yasuhiro Nonobe

It is certified that error appears in the above-identified patent and that said Letters Patent is hereby corrected as shown below:

Title page,
Item [30] the Foreign Application Priority Data is incorrect. Item [30] should read as follows:

-- [30]    Foreign Application Priority Data

Jul. 22, 1996    [JP] Japan................................. 8-212031 --

Drawings,
Sheets 8 of 10 and 9 of 10 should appear as shown on the attached pages.

Signed and Sealed this

Eighth Day of January, 2002

Attest:

JAMES E. ROGAN
Attesting Officer        Director of the United States Patent and Trademark Office